United States Patent
Lafaquiere et al.

(10) Patent No.: US 11,326,001 B2
(45) Date of Patent: May 10, 2022

(54) COPOLYMER OF ETHYLENE AND OF MYRCENE

(71) Applicant: COMPAGNIE GENERALE DES ETABLISSEMENTS MICHELIN, Clermont-Ferrand (FR)

(72) Inventors: Vincent Lafaquiere, Clermont-Ferrand (FR); Emma Moreso, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 47 days.

(21) Appl. No.: 16/981,515

(22) PCT Filed: Mar. 18, 2019

(86) PCT No.: PCT/FR2019/050597
§ 371 (c)(1),
(2) Date: Sep. 16, 2020

(87) PCT Pub. No.: WO2019/180355
PCT Pub. Date: Sep. 26, 2019

(65) Prior Publication Data
US 2021/0009729 A1   Jan. 14, 2021

(30) Foreign Application Priority Data

Mar. 19, 2018 (FR) ..................... 1852304

(51) Int. Cl.
| | |
|---|---|
| *C08L 23/08* | (2006.01) |
| *C08L 47/00* | (2006.01) |
| *C08L 9/00* | (2006.01) |
| *C08F 236/22* | (2006.01) |
| *C08F 236/04* | (2006.01) |
| *C08F 210/02* | (2006.01) |
| *B60C 1/00* | (2006.01) |
| *C08K 3/04* | (2006.01) |
| *C08K 3/36* | (2006.01) |
| *C08F 4/52* | (2006.01) |
| *C08F 210/14* | (2006.01) |
| *C08F 210/16* | (2006.01) |

(52) U.S. Cl.
CPC .............. *C08F 210/02* (2013.01); *B60C 1/00* (2013.01); *C08F 236/22* (2013.01); *C08F 4/52* (2013.01); *C08F 210/14* (2013.01); *C08F 210/16* (2013.01); *C08F 236/045* (2013.01); *C08K 3/04* (2013.01); *C08K 3/36* (2013.01); *C08K 2201/011* (2013.01); *C08L 9/00* (2013.01); *C08L 23/083* (2013.01); *C08L 47/00* (2013.01)

(58) Field of Classification Search
None
See application file for complete search history.

(56) References Cited

U.S. PATENT DOCUMENTS

| | | | |
|---|---|---|---|
| 3,480,599 | A | 11/1969 | Park et al. |
| 3,846,387 | A | 11/1974 | Su |
| 5,837,791 | A | 11/1998 | Sagane et al. |

FOREIGN PATENT DOCUMENTS

| | | | |
|---|---|---|---|
| CN | 107903349 A | * | 4/2018 |
| FR | 2179772 A1 | | 11/1973 |

OTHER PUBLICATIONS

Laur, E. et al. "Stereoselective Copolymerization of Styrene with Terpenes Catalyzed by an Ansa-Lanthanidocene Catalyst: Access to New Syndiotactic Polystyrene-Based Materials". Catalysts 2017, 7(12), 361, 1-12. (Year: 2017).*
International Search Report and Written Opinion corresponding to PCT/FR2019/050597 dated Mar. 18, 2019.
Laur, Eva; Stereoselective Copolymerization of Styrene with Terpenes Catalyzed by an Ansa-Lanthanidocene Catalyst: Access to New Syndiotactic Polystyrene-Based Materials; Catalysts 2017, 7, 361, pp. 1-12.

* cited by examiner

*Primary Examiner* — Richard A Huhn
(74) *Attorney, Agent, or Firm* — Dickinson Wright PLLC

(57) ABSTRACT

A copolymer of ethylene and of myrcene, in which the ethylene units represent between 50 mol % and 95 mol % of the ethylene units and of the myrcene units, and the myrcene units of 1,2 and 3,4 configuration represent more than 50 mol % of the myrcene units, is provided. Such a copolymer exhibits an improved compromise between the degree of crystallinity and the stiffness. It therefore makes it possible to widen the field of application of ethylene-rich diene copolymers in rubber compositions, and also to increase the production capacity of a unit for the synthesis of ethylene-rich diene polymers.

18 Claims, No Drawings

COPOLYMER OF ETHYLENE AND OF MYRCENE

The field of the invention is that of copolymers of conjugated diene and of ethylene, rich in ethylene unit and usable as elastomers in a rubber composition for tyres.

The most widely used diene elastomers in the manufacture of tyres are polybutadienes, polyisoprenes, in particular natural rubber, and copolymers of 1,3-butadiene and of styrene. The point common to these elastomers is the high molar proportion of diene units in the elastomer, generally much greater than 50%, which can render them sensitive to oxidation, in particular under the action of ozone.

The Applicant Company has described elastomers which, on the contrary, are relatively poor in diene units, in particular for the purpose of reducing their sensitivity to oxidation phenomena. These elastomers are, for example, described in the document WO 2007054223. These are copolymers of 1,3-butadiene and of ethylene containing more than 50 mol % of ethylene unit. These elastomers are described as ethylene-rich diene elastomers.

Ethylene-rich copolymers of 1,3-butadiene and of ethylene are crystalline and experience an increase in their their crystallinity with the content of ethylene. The presence of crystalline parts in the copolymer can be problematic when the copolymer is used in a rubber composition. As the melting of the crystalline parts of the copolymer results in a fall in its stiffness, a rubber composition containing such a copolymer and used in a tyre will also experience a decrease in its stiffness when it is brought to temperatures equalling or exceeding the melting point of the crystalline parts, which may be the case during repeated phases of braking and of acceleration of the tyre. This dependency of the stiffness as a function of the temperature can thus result in uncontrolled fluctuations in the performance qualities of the tyre. It is advantageous to have available diene polymers rich in ethylene units, the crystallinity of which is reduced, indeed even eliminated.

In the document WO 2007054224, the Applicant Company has described ethylene-rich diene copolymers which exhibit a reduced crystallinity. These copolymers are copolymers of 1,3-butadiene and of ethylene which additionally contain saturated 6-membered cyclic hydrocarbon motifs. Nevertheless, these copolymers introduced into a rubber composition can confer an excessively high stiffness on the rubber composition. The high stiffness of the rubber composition is attributed to an equally high stiffness of the elastomer. A high stiffness of a rubber composition can be problematic as it can itself also render the rubber composition unsuitable for certain applications.

In order to produce these copolymers of ethylene and of 1,3-butadiene rich in ethylene and comprising saturated 6-membered cyclic hydrocarbon motifs, the Applicant Company has developed a catalytic system based on a metallocene of formula (I) and on an organomagnesium compound, as is described, for example, in the document WO 2007054224,

$$P(Cp^1)(Cp^2)Nd(BH_4)_{(1+y)}\text{-}L_y\text{-}N_x \qquad (I)$$

$Cp^1$ and $Cp^2$, which are identical or different, being selected from the group consisting of substituted fluorenyl groups and the unsubstituted fluorenyl group of formula $C_{13}F_{18}$, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, an integer, being equal to or greater than 0, x, an integer or non-integer, being equal to or greater than 0, L representing an alkali metal selected from the group consisting of lithium, sodium and potassium, and N representing a molecule of an ether, preferably diethyl ether or tetrahydrofuran.

As everyone knows, the capacity of a unit for the production of a given polymer is related to the productivity of the production unit. One means for increasing the productivity of a production unit involving a polymerization in the presence of a catalytic system based on a metallocene is to increase the catalytic activity. This gain in catalytic activity is thus continually sought for in order to render a process for the synthesis of a polymer more productive for the purpose of minimizing the production costs of a polymerization unit and increasing its production capacity.

Pursuing its aim of synthesizing ethylene-rich diene elastomers, the Applicant Company has discovered a new polymer which makes it possible to solve the problems mentioned.

Thus, a first subject-matter of the invention is a copolymer, preferably an elastomer, of ethylene and of myrcene which comprises ethylene units and myrcene units, the ethylene units representing between 50 mol % and 95 mol % of the ethylene units and of the myrcene units, and the myrcene units of 1,2 and 3,4 configuration representing more than 50 mol % of the myrcene units.

Another subject-matter of the invention is a process for the preparation of the copolymer in accordance with the invention.

The invention also relates to a rubber composition based at least on the elastomer in accordance with the invention and on a crosslinking system, as well as to a tyre which comprises the rubber composition in accordance with the invention.

I. DETAILED DESCRIPTION OF THE INVENTION

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into a copolymer are expressed as molar percentage with respect to all of the monomer units of the copolymer.

The compounds mentioned in the description can be of fossil origin or be biosourced. In the latter case, they can result, partially or completely, from biomass or be obtained from renewable starting materials resulting from biomass. The monomers are concerned in particular.

As the myrcene is a substituted 1,3-diene, the myrcene can give rise to units of 1,2 configuration represented by the formula (1), of 3,4 configuration represented by the formula (2) and of 1,4 configuration, the trans form of which is represented below by the formula (3). The units resulting from the polymerization of the myrcene are called myrcene units.

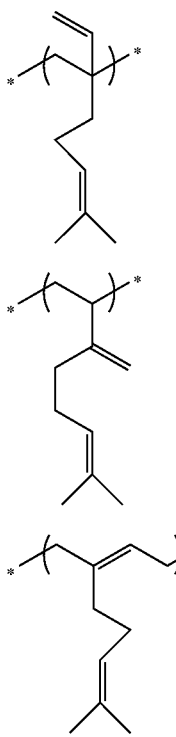

(1)

(2)

(3)

As is also well known, the ethylene unit is a unit of —(CH$_2$—CH$_2$)— motif.

The copolymer in accordance with the invention is a copolymer of ethylene and of myrcene, which implies that the monomer units of the copolymer are units resulting from the polymerization of ethylene and of the myrcene, that is ethylene units and myrcene units. The copolymer thus comprises ethylene units and myrcene units.

The essential characteristic of the copolymer of ethylene and of myrcene in accordance with the invention is to comprise between 50 mol % and 95 mol % of ethylene unit. In other words, the ethylene units represent between 50 mol % and 95 mol % of the ethylene units and of the myrcene units. Another essential characteristic is also to comprise myrcene units which are, to more than 50 mol %, myrcene units of 1,2 and 3,4 configuration. In other words, the myrcene units, whether they are of 1,2 or 3,4 configuration, represent more than 50 mol % of the myrcene units. Preferably, the myrcene units of 1,2 and 3,4 configuration represent more than 55 mol % of the myrcene units. The remainder to 100 mol % of the myrcene units in the copolymer is completely or partially formed of myrcene units of 1,4 configuration. According to any one of the embodiments of the invention, preferentially more than half of the myrcene units of 1,4 configuration are of trans-1,4 configuration, more preferentially all the myrcene units of 1,4 configuration are of trans-1,4 configuration.

According to a preferential embodiment of the invention, in the copolymer in accordance with the invention, the ethylene units represent at least 60 mol % of the ethylene units and of the myrcene units. More preferentially, the ethylene units represent from 60 mol % to 90 mol % of the ethylene units and of the myrcene units.

According to a more preferential embodiment of the invention, in the copolymer in accordance with the invention, the ethylene units represent at least 70 mol % of the ethylene units and of the myrcene units. More preferentially, the ethylene units represent from 70 mol % to 90 mol % of the ethylene units and of the myrcene units.

Preferably, the copolymer in accordance with the invention has a glass transition temperature of less than −35° C., in particular of between −70° C. and −35° C.

More preferentially, the copolymer in accordance with the invention is an elastomer.

The copolymer in accordance with the invention can be prepared by a process which comprises the copolymerization of ethylene and of myrcene in the presence of a catalytic system based at least on a metallocene of formula (II) and on an organomagnesium compound of formula (II)

Cp$^1$ and Cp$^2$, which are identical or different, being selected from the group consisting of substituted fluorenyl groups and the unsubstituted fluorenyl group of formula C$_{13}$F$_{18}$, P being a group bridging the two Cp$^1$ and Cp$^2$ groups and representing a ZR$^3$R$^4$ group, Z representing a silicon or carbon atom, R$^3$ and R$^4$, which are identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, R$^1$ and R$^2$, which are identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the positions of the carbon atoms of the rings as represented in the scheme below, the 9 position corresponding to the carbon atom to which the bridge P is attached.

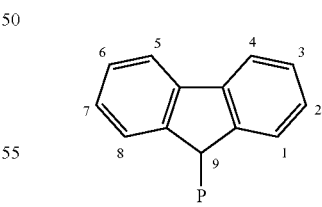

The catalytic system can be prepared conventionally by a process analogous to that described in Patent Application WO 2007054224. For example, the organomagnesium compound and the metallocene can be reacted in a hydrocarbon solvent typically at a temperature ranging from 20 to 80° C. for a period of time of between 5 and 60 minutes. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the copolymer in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in Patent Application WO 2007054224. The metallocene can be prepared conventionally by a process analogous to that described in Patent Application WO 2007054224, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in the solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

Preferably, the metallocene is of formula (Ia), (Ib), (Ic), (Id) or (Ie), in which the symbol Flu represents the fluorenyl group of formula $C_{13}H_8$.

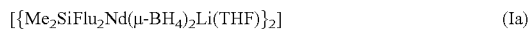

[{Me$_2$SiFlu$_2$Nd(μ-BH$_4$)$_2$Li(THF)}$_2$]  (Ia)

[Me$_2$SiFlu$_2$Nd(μ-BH$_4$)$_2$Li(THF)]  (Ib)

[Me$_2$SiFlu$_2$Nd(μ-BH$_4$)(THF)]  (Ic)

[{Me$_2$SiFlu$_2$Nd(μ-BH$_4$)(THF)}$_2$]  (Id)

[Me$_2$SiFlu$_2$Nd(μ-BH$_4$)]  (Ie)

The organomagnesium compound of use for the requirements of the invention is of formula MgR$^1$R$^2$ in which R$^1$ and R$^2$, which are identical or different, represent a carbon group. Carbon group is understood to mean a group which contains one or more carbon atoms. Preferably, R$^1$ and R$^2$ contain from 2 to 10 carbon atoms. More preferentially, R$^1$ and R$^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferably is greater than or equal to 1 and less than 10. The range of values extending from 1 to less than 10 is in particular more favourable for obtaining copolymers of high molar masses.

A person skilled in the art also adapts the polymerization conditions and the concentrations of each of the reactants (constituents of the catalytic system, monomers) according to the equipment (devices, reactors) used to carry out the polymerization and the various chemical reactions. As is known to a person skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise. The polymerization solvent can be an aromatic or aliphatic hydrocarbon solvent. Mention may be made, as example of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30 to 150° C., preferentially from 30 to 120° C. Preferably, the copolymerization is carried out at constant ethylene pressure.

The polymerization can be halted by cooling the polymerization medium. The polymer can be recovered according to conventional techniques known to a person skilled in the art, such as, for example, by precipitation, by evaporation of the solvent under reduced pressure or by steam stripping.

According to any one of the embodiments of the invention, the incorporation of the myrcene and of the ethylene into the growing polymer chain is preferentially random. The copolymer in accordance with the invention is advantageously a random copolymer.

The copolymer in accordance with the invention, in particular when it is an elastomer, can be used in a rubber composition.

The rubber composition, which is another subject-matter of the invention, has the characteristic of comprising the elastomer in accordance with the invention and a crosslinking system.

The crosslinking system can be based on sulfur, on sulfur donors, on peroxides, on bismaleimides or on their mixtures. The crosslinking system is preferentially a vulcanization system, that is to say a system based on sulfur (or on a sulfur donor) and on a primary vulcanization accelerator. Additional to this base vulcanization system are optionally various known secondary vulcanization accelerators or vulcanization activators, such as zinc oxide, stearic acid or equivalent compounds, or guanidine derivatives (in particular diphenylguanidine), or also known vulcanization retarders.

According to a preferential embodiment of the invention, the rubber composition comprises a reinforcing filler. The rubber composition can comprise any type of "reinforcing" filler known for its abilities to reinforce a rubber composition which can be used for the manufacture of tyres, for example an organic filler, such as carbon black, a reinforcing inorganic filler, such as silica, with which is combined, in a known way, a coupling agent, or also a mixture of these two types of filler. Such a reinforcing filler typically consists of nanoparticles, the (weight-) average size of which is less than a micrometre, generally less than 500 nm, most often between 20 and 200 nm, in particular and more preferentially between 20 and 150 nm. The content of reinforcing filler is adjusted by a person skilled in the art according to the use of the rubber composition.

The rubber composition can additionally contain other additives known to be used in rubber compositions for tyres, such as plasticizers, antiozonants or antioxidants.

The rubber composition in accordance with the invention is typically manufactured in appropriate mixers, using two successive phases of preparation well known to a person skilled in the art: a first phase of thermomechanical working or kneading ("non-productive" phase) at high temperature, up to a maximum temperature of between 130° C. and 200°

C., followed by a second phase of mechanical working ("productive" phase) up to a lower temperature, typically of less than 110° C., for example between 40° C. and 100° C., during which finishing phase the crosslinking system is incorporated.

The rubber composition in accordance with the invention, which can be either in the raw state (before crosslinking or vulcanization) or in the cured state (after crosslinking or vulcanization), can be used in a tyre semi-finished article.

The tyre, which is another subject-matter of the invention, comprises the rubber composition in accordance with the invention defined under any one of the embodiments of the invention.

A better understanding of the abovementioned characteristics of the present invention, and also others, will be obtained on reading the following description of several implementational examples of the invention, given by way of illustration and without limitation.

II. IMPLEMENTATIONAL EXAMPLES OF THE INVENTION

All the reactants are obtained commercially, except the metallocenes [{Me$_2$SiFlu$_2$Nd(μ-BH$_4$)$_2$Li(THF)}] and [Me$_2$SiCpFluNd(μ-BH$_4$)$_2$Li(THF)], which are prepared according to the procedures described in Patent Applications WO 2007054224 and WO 2007054223. The butyloctylmagnesium BOMAG (20% in heptane, C=0.88 mol.l$^{-1}$) originates from Chemtura and is stored in a Schlenk tube under an inert atmosphere. The ethylene, of N35 grade, originates from Air Liquide and is used without prepurification. The myrcene (purity≥95%) is obtained from Sigma-Aldrich.

1) Determination of the Microstructure of the Polymers:

The spectral characterization and the measurements of the microstructure of ethylene-myrcene copolymer are carried out by nuclear magnetic resonance (NMR) spectroscopy.

Spectrometer: For these measurements, a Bruker Avance III HD 400 MHz spectrometer is used, equipped with a Bruker cryo-BBFO z-grad 5 mm probe.

Experiments: The $^1$H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. The experiments are carried out at 25° C.

Preparation of the sample: 25 mg of sample are dissolved in 1 ml of deuterated chloroform (CDCl$_3$).

Calibration of the sample: The axes of the $^1$H and $^{13}$C chemical shifts are calibrated with respect to the protonated impurity of the solvent (CHCl$_3$) at $\delta_{1H}$=7.2 ppm and $\delta_{13C}$=77 ppm.

Spectral assignment: The signals of the insertion forms of the myrcene A, B and C (Scheme 1) were observed on the different spectra recorded. According to S. Georges et al. (S. Georges, M. Bria, P. Zinck and M. Visseaux, Polymer, 55 (2014), 3869-3878), the signal of the —CH═group No. 8" characteristic of the form C exhibits $^1$H and $^{13}$C chemical shifts identical to the —CH═group No. 3.

The chemical shifts of the signals characteristic of the motifs A, B and C are presented in Table 1. The motifs A, B and C correspond respectively to the units of 3,4 configuration, of 1,2 configuration and of trans-1,4 configuration.

Scheme 1

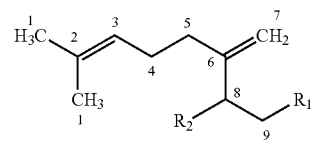

A

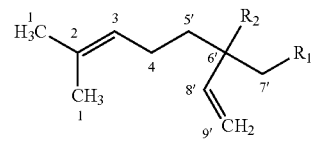

B

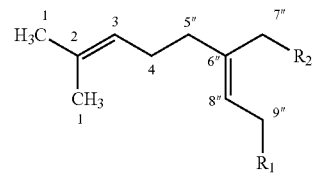

C

TABLE 1

Assignment of the $^1$H and $^{13}$C signals of Ethylene/Myrcene copolymers

| $\delta_{1H}$ (ppm) | $\delta_{13C}$ (ppm) | Group |
|---|---|---|
| 5.54 | 146.4 | 8' |
| 5.07 | 124.6 | 3 + 8" |
| 4.97-4.79 | 112.0 | 9' |
| 4.67 | 108.5 | 7 |
| 2.06 | 26.5 | 4 |
| 2.0-1.79 | 31.8 | 5 + 5' + 5" |
|  | 44.5 | 8 |
| 1.59 | 25.9 and 17.0 | 1 |
| 1.2 | 36.8-24.0 | CH$_2$ ethylene |

The quantifications were carried out from the integration of the 1D $^{1H}$ NMR spectra using the Topspin software.

The integrated signals for the quantification of the different motifs are:

Ethylene: signal at 1.2 ppm corresponding to 4 protons

Total myrcene: signal No. 1 (1.59 ppm) corresponding to 6 protons

Form A: signal No. 7 (4.67 ppm) corresponding to 2 protons

Form B: signal No. 8' (5.54 ppm) corresponding to 1 proton

The quantification of the microstructure is carried out in molar percentage (molar %) as follows: Molar % of a motif=$^1$H integral of a motif*100/Σ($^1$H integrals of each motif).

2) Determination of the Stiffness of the Polymers (in the Raw State):

The measurements are carried out on an Anton Paar model MCR301 rheometer in shear mode with cylindrical test specimens of controlled geometry (thickness of between 1.5 mm and 3 mm and diameter of between 22 mm and 28 mm). The sample is subjected to a sinusoidal shear stress, at a fixed temperature (corresponding to the end of the passage of the glass transition of the elastomer over a temperature sweep at 10 Hz), and over a frequency range extending from 0.01 Hz to 100 Hz. The stiffness value selected as being the stiffness of the rubbery plateau of the sample is the value of the shear modulus G' for the frequency at which the loss modulus G" reaches its minimum, in accordance with the method described by C. Liu, J. He, E. van Ruymbeke, R. Keunings and C. Bailly, Evaluation of different methods for the determination of the plateau modulus and the entanglement molecular weight, Polymer, 47 (2006), 4461-4479.

3) Determination of the Glass Transition Temperature of the Polymers:

The glass transition temperature is measured by means of a differential calorimeter (differential scanning calorimeter) according to Standard ASTM D3418 (1999).

4) Determination of the Degree of Crystallinity of the Polymers:

Standard ISO 11357-3:2011 is used to determine the temperature and enthalpy of fusion and of crystallization of the polymers used by differential scanning calorimetry (DSC). The reference enthalpy of polyethylene is 277.1 J/g (according to Polymer Handbook, 4th Edition, J. Brandrup, E. H. Immergut and E. A. Grulke, 1999).

5) Synthesis of the Polymers: 5.1-Control Synthesis: Example 1

The polymer is synthesized according to the following procedure:

The cocatalyst, the butyloctylmagnesium (BOMAG) and then the metallocene [$Me_2SiCpFluNd(\mu-BH_4)_2Li(THF)$] are added to a 500-ml glass reactor containing 300 ml of toluene. The alkylation time is 10 minutes and the reaction temperature is 20° C. The respective amounts of the constituents of the catalytic system appear in Table 2. Subsequently, the monomers are added according to the respective proportions shown in Table 2, the ethylene (Eth) and the 1,3-butadiene (Bde) being in the form of a gaseous mixture. The polymerization is carried out at 80° C. and at a constant ethylene pressure of 4 bars. The polymerization reaction is halted by cooling, degassing of the reactor and addition of 10 ml of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol.h).

5.2- Example not in accordance with the invention: Example 2

The polymer is synthesized according to the following procedure:

The cocatalyst, the butyloctylmagnesium (BOMAG) and then the metallocene [$Me_2Si(Flu)_2Nd(\mu-BH_4)_2Li(THF)$] are added to a 500-ml glass reactor containing 300 ml of methylcyclohexane. The alkylation time is 10 minutes and the reaction temperature is 20° C. The respective amounts of the constituents of the catalytic system appear in Table 2. Subsequently, the monomers are added according to the respective proportions shown in Table 2, the ethylene (Eth) and the 1,3-butadiene (Bde) being in the form of a gaseous mixture. The polymerization is carried out at 80° C. and at a constant ethylene pressure of 4 bars. The polymerization reaction is halted by cooling, degassing of the reactor and addition of 10 ml of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol.h).

5.3- Examples in accordance with the invention: Examples 3 to 5

The polymers are synthesized according to the following procedure:

The cocatalyst, the butyloctylmagnesium (BOMAG) and then the metallocene [$Me_2Si(Flu)_2Nd(\mu-BH_4)_2Li(THF)$] are added to a 500-ml glass reactor containing 300 ml of methylcyclohexane. The alkylation time is 10 minutes and the reaction temperature is 20° C. The respective amounts of the constituents of the catalytic system appear in Table 2. Subsequently, the myrcene is added to the reactor before the injection of the gaseous ethylene. The polymerization is carried out at 80° C. and at a constant ethylene pressure of 4 bars.

The polymerization reaction is halted by cooling, degassing of the reactor and addition of 10 ml of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol.h).

The characteristics of the polymers appear in Tables 3 and 4.

6 Results:

In Example 1 (control), the diene copolymer rich in ethylene and synthesized by polymerization of ethylene and of the 1,3-butadiene in the presence of the metallocene [$Me_2SiCpFluNd(\mu-BH_4)_2Li(THF)$] exhibits a high crystallinity (31%), which can render it unsuitable for some uses.

In Example 2 (not in accordance), the diene copolymer rich in ethylene synthesized in the presence of the metallocene [$Me_2Si(Flu)_2Nd(\mu-BH_4)_2Li(THF)$] exhibits cyclic motifs. Although it contains an ethylene content comparable to that of the control, it is not crystalline. Nevertheless, it has a relatively high stiffness, which can render it unsuitable for some uses.

In Examples 3 to 5 (in accordance), the diene copolymers rich in ethylene are copolymers of ethylene and of myrcene. In Example 3, the copolymer has an ethylene content comparable to that of the copolymers of Examples 1 and 2, but without exhibiting their disadvantages. This is because it has the advantage both of not being crystalline and of having a significantly lower stiffness than the copolymer of Example 2.

In Example 4, the copolymer is much richer in ethylene (85%) than the control copolymer of Example 1 (74%) and yet it is much less crystalline (17%) than the control copolymer (31%). In Example 5, the copolymer has a higher myrcene content than the copolymers of Examples 3 and 4. It is not crystalline and also exhibits a lower stiffness. Examples 3 to 5 illustrate that a variation in the myrcene content in the copolymer makes it possible to improve the degree of crystallinity/stiffness compromise of ethylene-rich diene polymers, in comparison with the copolymers of ethylene and of 1,3-butadiene.

Furthermore, it is noted that, in Examples 3 to 5, the catalytic activity is greater than that of Example 2 by at least a factor of 2. Surprisingly, the use of myrcene in place of 1,3-butadiene as comonomer of the ethylene makes it possible to significantly increase the catalytic activity of the catalytic system.

To sum up, the replacement of 1,3-butadiene by myrcene makes it possible, on the one hand, to synthesize ethylene-rich diene polymers with an improved compromise between the degree of crystallinity and the stiffness and, on the other hand, to render the polymerization process more productive and to thus increase the production capacity of a unit for the synthesis of ethylene-rich diene polymers.

TABLE 2

| Example | Metallocene concentration (mmol/l) | Alkylating agent concentration (mmol/l) | Amount of myrcene (ml) | Gas mixture composition (mol % Eth/Bde) | Activity (kg/mol · h) | Weight of polymer (g) |
|---|---|---|---|---|---|---|
| Example 1 | 0.32 | 0.97 | 0 | 80/20 | 92 | 12.4 |
| Example 2 | 0.16 | 0.78 | 0 | 70/30 | 134 | 12.9 |
| Example 3 | 0.16 | 0.78 | 18 | 100/0 | 400 | 17.2 |
| Example 4 | 0.16 | 0.78 | 10.3 | 100/0 | 300 | 17.1 |
| Example 5 | 0.16 | 0.32 | 50 | 100/0 | 250 | 18.8 |

TABLE 3

| Examples | Ethylene (mol %) | Butadiene (mol %) | 1,2-Cyclohexanediyl (mol %) | Myrcene (mol %) | 1,4 Myrcene (mol %/mol % myrcene) | 1,2 Myrcene (mol %/mol % myrcene) | 3,4 Myrcene (mol %/mol % myrcene) |
|---|---|---|---|---|---|---|---|
| Example 1 | 73.5 | 26.5 | | | | | |
| Example 2 | 71 | 16 | 13 | | | | |
| Example 3 | 74 | | | 26 | 31 | 4 | 65 |
| Example 4 | 85 | | | 15 | 33 | 7 | 60 |
| Example 5 | 64 | | | 36 | 31 | 3 | 66 |

TABLE 4

| Examples | Tg (° C.) | Crystallinity (%) | Stiffness in the raw state (MPa) |
|---|---|---|---|
| Example 1 | −54 | 31 | — |
| Example 2 | −35 | 0 | 1 |
| Example 3 | −64 | 0 | 0.5 |
| Example 4 | −62 | 17 | — |
| Example 5 | −58 | 0 | 0.34 |

The invention claimed is:

1. A copolymer of ethylene and of myrcene which comprises ethylene units and myrcene units, the ethylene units representing between 50 mol % and 95 mol % of the ethylene units and of the myrcene units, and the myrcene units of 1,2 and 3,4 configuration representing more than 50 mol % of the myrcene units.

2. The copolymer of ethylene and of myrcene according to claim 1, in which the ethylene units represent at least 60 mol % of the ethylene units and of the myrcene units.

3. The copolymer of ethylene and of myrcene according to claim 1, in which the ethylene units represent from 60 mol % to 90 mol % of the ethylene units and of the myrcene units.

4. The copolymer of ethylene and of myrcene according to claim 1, in which the ethylene units represent at least 70 mol % of the ethylene units and of the myrcene units.

5. The copolymer of ethylene and of myrcene according to claim 1, in which the ethylene units represent from 70 mol % to 90 mol % of the ethylene units and of the myrcene units.

6. The copolymer of ethylene and of myrcene according to claim 1, in which the myrcene units of 1,2 and 3,4 configuration represent more than 55 mol % of the myrcene units.

7. The copolymer of ethylene and of myrcene according to claim 1, which copolymer has a glass transition temperature of less than −35° C.

8. The copolymer of ethylene and of myrcene according to claim 1, which copolymer has a glass transition temperature of between −70° C. and −35° C.

9. The copolymer of ethylene and of myrcene according to claim 1, which copolymer is a random copolymer.

10. The copolymer of ethylene and of myrcene according to claim 1, which copolymer is an elastomer.

11. A process for the preparation of a copolymer defined in claim 1, which comprises the polymerization of ethylene and of myrcene in the presence of a catalytic system based at least on a metallocene of formula (I) and on an organomagnesium compound of formula (II)

$$P(Cp^1Cp^2)Nd(BH_4)_{(1+y)}\text{-}L_y\text{-}N_x \quad (I)$$

$$MgR^1R2 \quad (II)$$

Cp² and Cp², which are identical or different, being selected from the group consisting of substituted fluorenyl groups and the unsubstituted fluorenyl group of formula $C_{13}H_8$, P being a group bridging the two Cp¹ and Cp² groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0 x, which is or is not an integer, being equal to or greater than 0

L representing an alkali metal selected from the group consisting of lithium, sodium and potassium, N representing a molecule of an ether, $R^1$ and $R^2$, which are identical or different, representing a carbon group.

12. The process according to claim 11, in which the metallocene is of formula (Ia), (Ib), (Ic), (Id) or (Ie)

$$[\{Me_2SiFlu_2Nd(\mu\text{-}BH_4)_2Li(THF)\}2] \quad (Ia)$$

$$[Me_2SiFlu_2Nd(\mu\text{-}BH_4)_2Li(THF)] \quad (Ib)$$

$$[Me_2SiFlu_2Nd(\mu\text{-}BH_4)(THF)] \quad (Ic)$$

$$[\{Me_2SiFlu_2Nd(\mu\text{-}BH_4)(THF)\}_2] \quad (Id)$$

$$[Me_2SiFlu_2Nd(\mu\text{-}BH_4)] \quad (Ie)$$

the symbol Flu representing the fluorenyl group of formula $C_{13}H_8$.

13. The process according to claim 11, in which $R^1$ and $R^2$ contain from 2 to 10 carbon atoms.

14. The process according to claim 11, in which $R^1$ and $R^2$ each represent an alkyl.

15. The process according to claim 11, in which the organomagnesium compound is a dialkylmagnesium compound.

16. A rubber composition based at least on a copolymer defined in claim 10 and on a crosslinking system.

17. The rubber composition according to claim 16, which comprises a reinforcing filler.

18. A tire which comprises a rubber composition defined in claim 16.

* * * * *